(12) United States Patent
Clemen

(10) Patent No.: US 8,251,654 B2
(45) Date of Patent: Aug. 28, 2012

(54) HUB CONE FOR AN AIRCRAFT ENGINE

(75) Inventor: Carsten Clemen, Mittenwalde (DE)

(73) Assignee: Rolls-Royce Deutschland Ltd Co KG (DE)

( * ) Notice: Subject to any disclaimer, the term of this patent is extended or adjusted under 35 U.S.C. 154(b) by 527 days.

(21) Appl. No.: 12/610,903

(22) Filed: Nov. 2, 2009

(65) Prior Publication Data

US 2010/0111702 A1    May 6, 2010

(30) Foreign Application Priority Data

Nov. 3, 2008    (DE) .................. 10 2008 055 631

(51) Int. Cl.
*B64C 11/14*    (2006.01)
(52) U.S. Cl. ............. 415/218.1; 415/220; 415/227
(58) Field of Classification Search ............. 415/218.2, 415/220, 227
See application file for complete search history.

(56) References Cited

U.S. PATENT DOCUMENTS

| | | | |
|---|---|---|---|
| 1,402,539 A | 1/1922 | Ross | |
| 2,934,150 A * | 4/1960 | Fink | 416/239 |
| 4,419,053 A * | 12/1983 | Swearingen, Jr. | 416/234 |
| 4,790,725 A | 12/1988 | Bousquet et al. | |
| 4,796,424 A | 1/1989 | Farrar et al. | |
| 5,167,489 A * | 12/1992 | Wadia et al. | 415/182.1 |
| 5,224,833 A * | 7/1993 | Nicholas et al. | 416/245 R |

FOREIGN PATENT DOCUMENTS

GB    858706    1/1961

OTHER PUBLICATIONS

German Search Report dated Feb. 2, 2010 from counterpart patent application.

* cited by examiner

*Primary Examiner* — Igor Kershteyn
(74) *Attorney, Agent, or Firm* — Timothy J. Klima; Shuttleworth & Ingersoll, PLC

(57) ABSTRACT

A hub cone (20, 30, 40) is provided for an aircraft engine having a propeller (2, 32, 42) or a blower (fan) (3) enveloped by a casing (5). To reduce flow losses of the hub cone and increase efficiency of the engine, a contour of the hub cone is described by the following equation:

Figure 1:
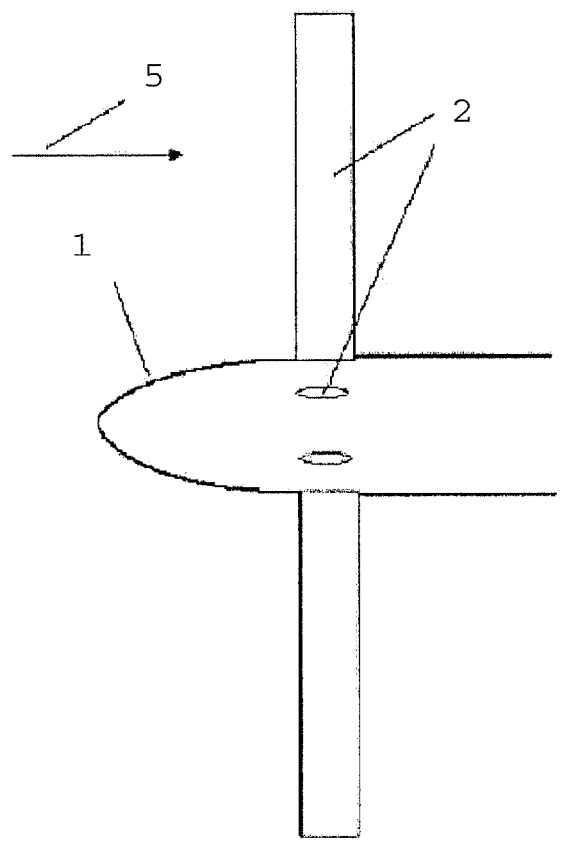

$$S(x) = R_{max} * \{1 - [(x - L_{max})/L_{max}]^2\}^{1/M};\ \text{where:}$$

$S(x)$ is a shape of the cone defined along the machine axis x; $R_{max}$ is a maximum extension (26) of the cone in the radial direction; $L_{max}$ is a maximum extension (25) of the cone in the direction of the machine axis x and M is a quantity describing the shape $S(x)$.

8 Claims, 5 Drawing Sheets

HUB CONE FOR AN AIRCRAFT ENGINE

This application claims priority to German Patent Application DE 10 2008 055 631.9 filed Nov. 3, 2008, the entirety of which is incorporated by reference herein.

This invention relates to a hub cone for an aircraft engine.

An aircraft engine having a propeller or a blower (fan) enveloped by a casing is characterized in that, upstream of the propeller or blower, a hub cone is arranged which is designed such that the inflow is conducted as favorably as possible onto the hub radius of the blower or propeller, respectively. The hub cone co-rotates with the propeller or blower, respectively. When the inflow passes over the contour of the hub cone, a boundary layer is generated along the contour. This boundary layer, which increases with the running length, effects that the blower or propeller hub, respectively, is unfavorably approached by the inflow, i.e. very slowly and at a steep angle of incidence. For the state of the art for turboprop aircraft engines, reference is made to Specifications U.S. Pat. No. 4,796,424A and US 2004179941A.

The approaching boundary layer, which has a thickness in the millimeter range, affects how the blower or propeller hub profiles, respectively, are unfavorably reached by the inflow, i.e. very slowly and at a steep angle of incidence. This is undesirable as a steep inflow promotes flow separation on the hub-near blade profiles. This leads to losses and unfavorable outflow of the blower or propeller, respectively. The losses reduce efficiency, and the unfavorable outflow affects the efficiency and the flow conditions on the downstream engine components.

In a broad aspect, this invention provides a hub cone for an aircraft engine which avoids the above described disadvantages.

It is a particular object of the present invention to provide solution to the above problems by disclosing a hub cone contour which can be described by the following equation:

$$S(x) = R_{max} * \{1-[(x-L_{max})/L_{max}]^2\}^{1/M}$$

where:

$S(x)$: Is a shape of the cone, defined along the machine axis x (the horizontal cone axis);

$R_{max}$: Is a maximum extension of the cone in the radial direction, i.e. vertically to the machine axis in the direction of the radial axis r;

$L_{max}$: Is a maximum extension of the cone in the direction of the machine axis, respectively;

M: Is a quantity describing the shape $S(x)$. M is a positive real number.

In order to minimize the boundary layer thickness, the present invention provides definition of a set of optimum shapes of the geometry of the hub or cone, respectively. The hub geometry can be defined by the mathematical equation such that the course thereof is continuous and monotonous and, accordingly, the boundary layer is not disturbed.

As per the above equation, a set of cone shapes producing minimum loss and minimum boundary layer thickness can be defined by suitable selection of the value of M. The set of curves so defined includes all values and all ranges of M between 1.50 and 1.98. Minimum loss is produced by those shapes which are generated with values of M ranging between 1.89 and 1.945. Optimum limiting contours of the shape curve $S(x)$ range between M=1.50 and 1.98.

The hub shapes produced with the equation provided and the values specified for the quantity M, which describes the shape $S(x)$, provide, in a test case, a 17 percent lower loss than, for example, an elliptical hub contour as it is commonly selected for the hub contour of a propeller. Examples of an optimized contour are hereinafter described in further detail. The optimum hub contour results in improved inflow of the propeller or blower, respectively, whose efficiency is thereby increased, and reduces the drag coefficient of the cone. Both results in reduced fuel consumption.

According to the present invention, the quantity M is a positive real number. Furthermore, a set of cone shapes is defined by suitable selection of the quantity M, with the defined set of curves including all values of M between 1.50 and 1.98. Finally, with values of M between 1.89 and 1.945, a hub cone can be described which enables minimum loss of power of the aircraft engine to be achieved.

Figure 2:
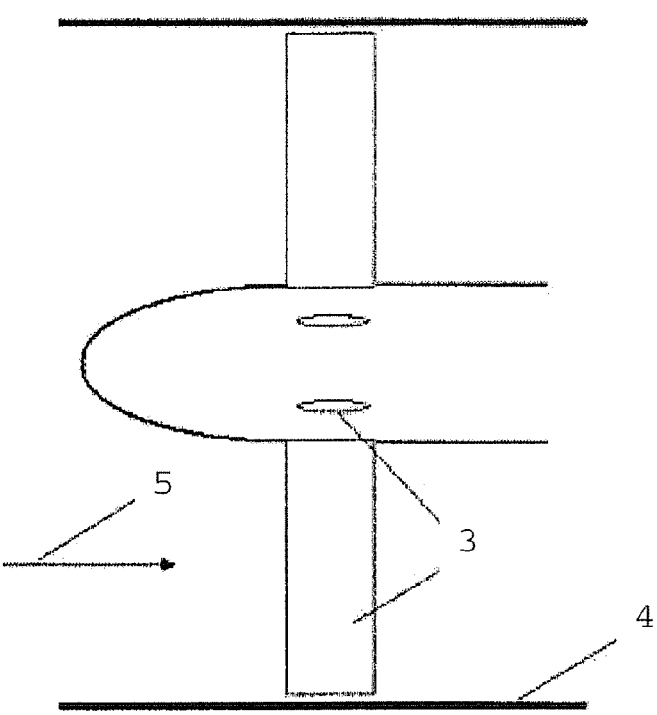
Figure 3:
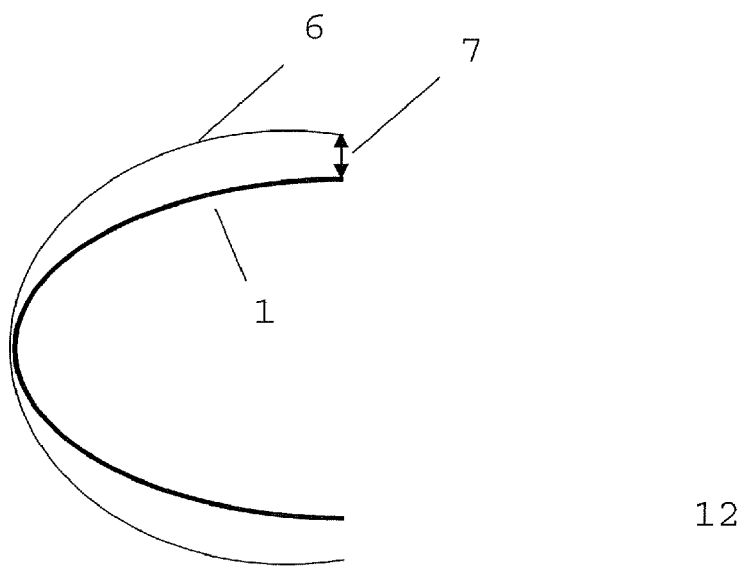
Figure 4:
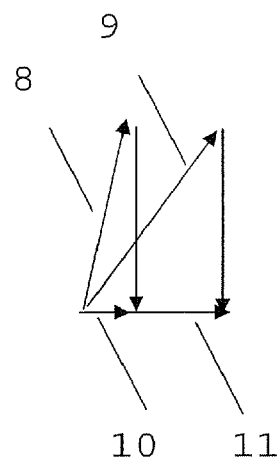
Figure 5:
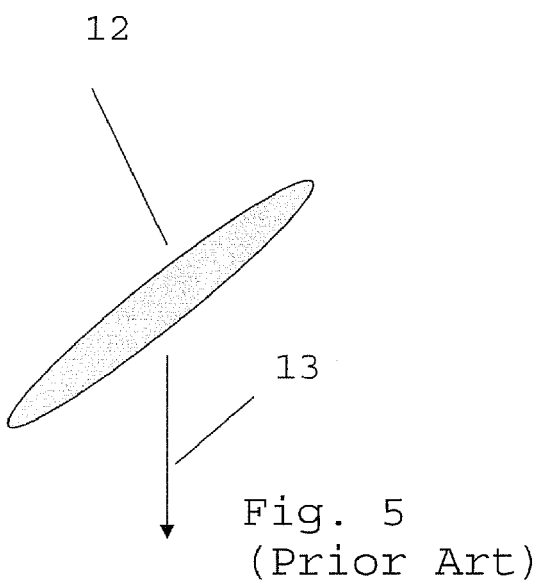
Figure 6:
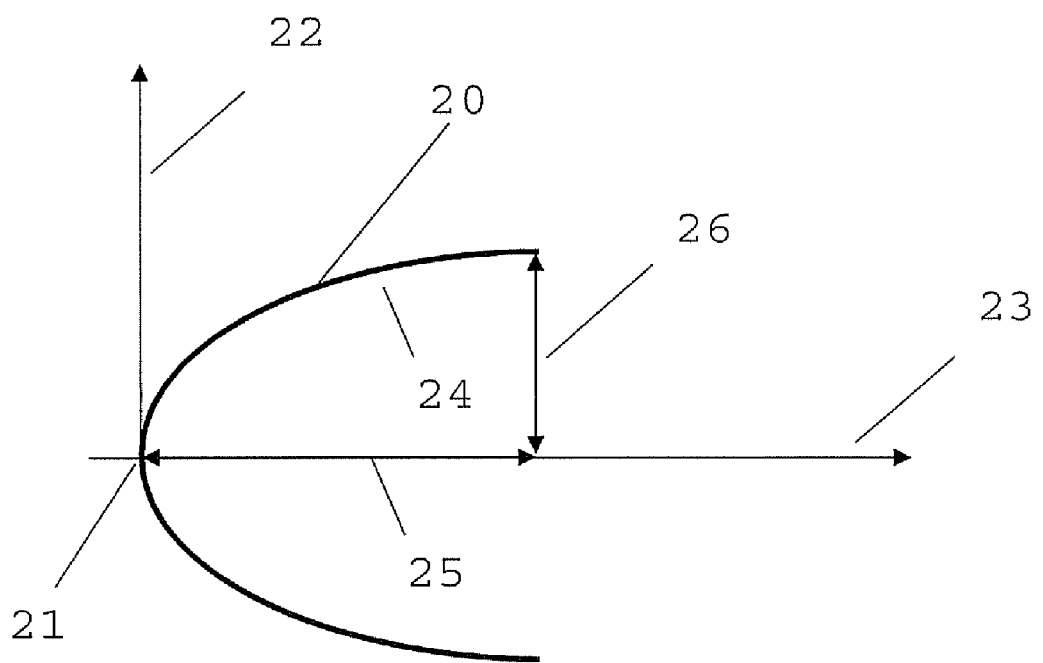
Figure 7:
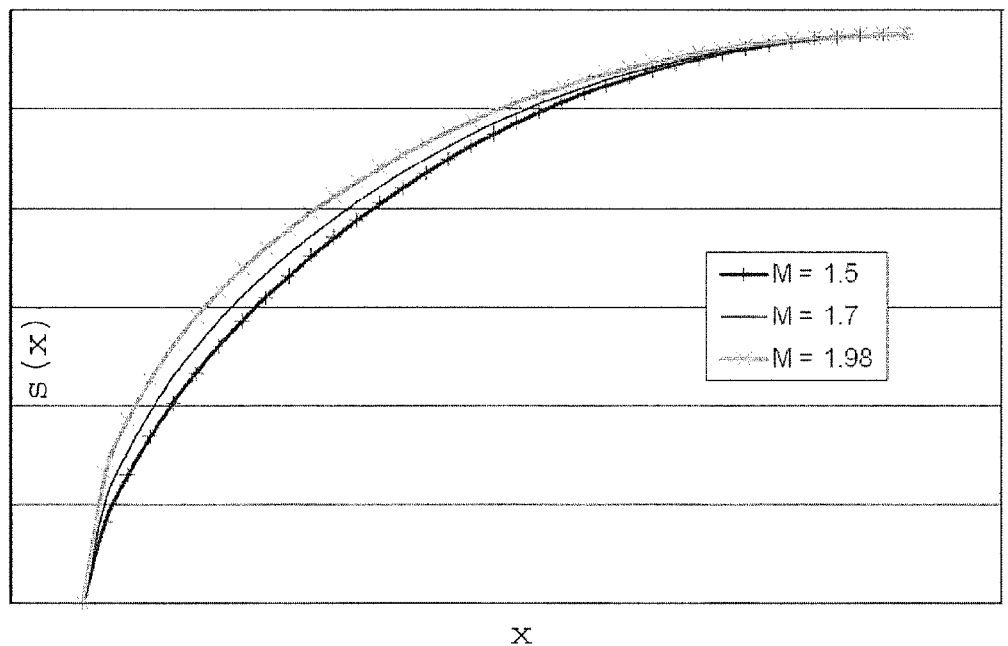
Figure 8:
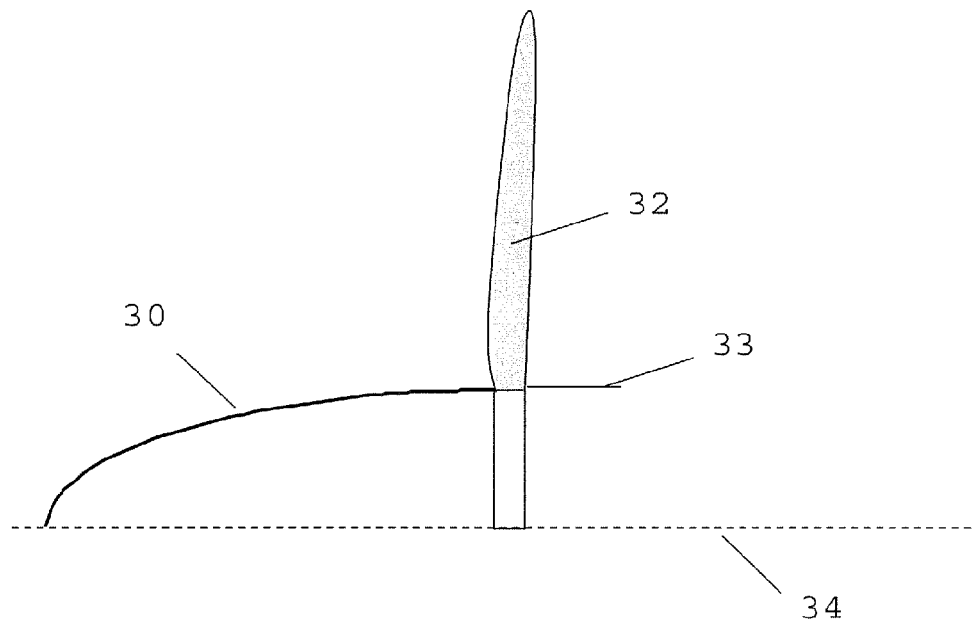
Figure 9:
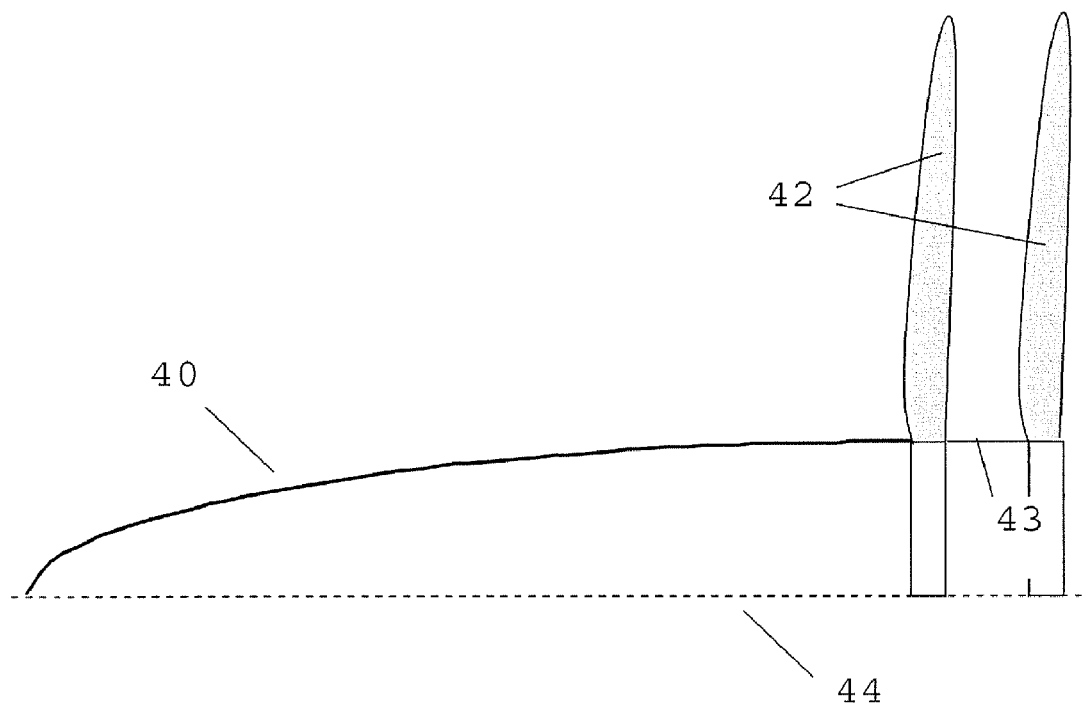

Embodiments of the hub cone in accordance with the present invention for an aircraft engine having a propeller or a blower (fan) enveloped by a casing are illustrated in the following drawings:

FIG. 1 (Prior Art) shows a hub cone for a propeller in accordance with the state of the art, FIG. 2 (Prior Art) shows a hub cone for a blower (fan) enveloped by a casing in accordance with the state of the art, FIG. 3 (Prior Art) shows the boundary layer thickness on a hub cone in accordance with the state of the art as per FIG. 1 or FIG. 2, FIG. 4 shows the angles of incidence and the inflow on a hub cone in accordance with the state of the art as per FIG. 1 or FIG. 2, FIG. 5 (Prior Art) shows the hub profile and the sense of rotation on a propeller in accordance with the state of the art as per FIG. 1, FIG. 6 shows definitions of the shape of the cone in the x-y-coordinate system, FIG. 7 shows the optimum cone shapes determined in accordance with the inventive equation as cone shape $S(x)$ versus the x-axis, FIG. 8 shows an embodiment of a hub cone in accordance with the present invention with single propeller in tractor configuration, and FIG. 9 shows an embodiment of a hub cone in accordance with the present invention with dual propeller in pusher configuration.

FIG. 1 (Prior Art) shows an essentially elliptical hub cone 1 with a propeller 2 of a turboprop aircraft engine in accordance with the state of the art. FIG. 2 (Prior Art) shows an essentially elliptical hub cone 1 with a blower (fan) 3 enveloped by a casing 4 of an aircraft engine according to the state of the art. The inflow is indicated by an arrowhead 5 each. The aircraft engine with the propeller (2) (FIG. 1) or the blower (fan) 3 enveloped by the casing 4 (FIG. 2) is characterized in that, upstream of the propeller 2 or the blower 3, a hub cone 1 with regularly elliptical shape is arranged which should be designed such that the inflow is as favorably as possible conducted onto the hub radius of the propeller 2 or the blower 3, respectively. The hub cone 1 co-rotates with the propeller 2 or blower 3, respectively. When the inflow passes over the contour of the hub cone 1, a boundary layer 6 (FIG. 3) is generated along the contour. This boundary layer 6, which increases with the running length, affects how the hub cone 1 of the propeller 2 or the blower 3, respectively, is unfavorably approached by the inflow, i.e. very slowly and at a steep angle of incidence.

The approaching boundary layer 6, which has a boundary layer thickness 7 (FIG. 3) in the millimeter range, affects how, on state-of-the-art hub cones 1 according to FIGS. 1 and 2, the profiles of the hub cones 1 of the propeller 2 or the blower 3, respectively, are unfavorably approached, i.e. with a very slow inflow 10 and at a steep angle of incidence 8 (see FIG. 4). This is undesirable since a steep inflow, or a steep angle of incidence 8, promotes flow separation on the profiles of the propeller 2 or the blower 3, respectively, situated near the cone 1. This leads to losses and unfavorable outflow of the propeller 2 or the blower 3, respectively. The losses reduce efficiency, and the unfavorable outflow impairs the efficiency and the flow conditions on the downstream engine components.

More favorable is a desired flatter angle of incidence 9 with desired faster inflow 11 as also shown in FIG. 4. FIG. 5 shows a hub profile 12 and the sense of rotation 13.

In order to achieve this and to minimize the boundary layer thickness 7, provision is made for the definition of a set of optimum shapes of the geometry of the hub cone 20 in accordance with the present invention. The geometry of the hub cone 20 can be described and defined by the following mathematical equation, such that the course of the hub cone 20 is continuous and monotonous and, accordingly, the boundary layer is not disturbed.

$$S(x) = R_{max} * \{1-[(x-L_{max})/L_{max}]^2\}^{1/M}$$

with definition being provided for the following quantities in the equation:

$S(x)$: Is a shape of the cone 20 defined along the machine axis x (the horizontal cone axis), $R_{max}$: Is a maximum extension of the cone 20 in the radial direction, i.e. vertically to the machine axis x in the direction of the radial axis r, $L_{max}$: Is a maximum extension of the cone 20 in the direction of the machine axis x, respectively, M: Is a quantity describing the shape $S(x)$. M is a positive real number.

To define the geometrical shape of the hub cone 20 according to the present invention, FIG. 6 shows the origin of the x-r-coordinate system at the tip 21 of the hub cone 20, the r-axis 22 extending radially and vertically to the machine axis 23, the outer contour 24 of the hub cone 20 and the maximum extensions 25 and 26 of the hub cone 20 in x-direction or in r-direction, respectively.

In order to minimize the boundary layer thickness 7, the present invention provides definition of a set of optimum shapes of the geometry of the hub cone 20. The hub cone geometry can be defined by the mathematical equation such that the course thereof is continuous and monotonous and, accordingly, the boundary layer is not disturbed.

As per the above equation, a set of cone shapes producing minimum loss and minimum boundary layer thickness can be defined by suitable selection of the value of M.

The set of curves so defined includes all values of M between 1.50 and 1.98 as per FIG. 7. Minimum loss is produced by those shapes which are generated with values of M ranging between 1.89 and 1.945. Optimum limiting contours of the shape curve $S(x)$ range between M=1.50 and 1.98. FIG. 7 shows a further shape curve $S(x)$ for M=1.7.

The hub shapes produced with the equation provided and the values specified for the quantity M, which describes the shape $S(x)$, provide, in a test case, a 17 percent lower loss than, for example, an elliptical hub contour as it is commonly selected for the hub contour of a propeller. The optimum hub contour results in improved inflow of the propeller 2 or blower 3, respectively, whose efficiency is thereby increased, and reduces the drag coefficient of the hub cone 20. Both results in reduced fuel consumption.

An example of a hub cone 30 optimized according to the present invention with hub body 33 and machine axis 34 is shown in FIG. 8 for a single propeller 32 in tractor configuration. Here, the hub cone rotates. A further example of a hub cone 40 optimized according to the present invention with hub body 43 and machine axis 44 is shown in FIG. 9 for a dual propeller 42 in pusher configuration. Here, the hub cone is stationary.

LIST OF REFERENCE NUMERALS

1 Hub cone
2 Propeller
3 Blower (fan)
4 Casing
5 Approaching flow
6 Boundary layer
7 Boundary layer thickness
8 Steep angle of incidence
9 Desired angle of incidence
10 Slow inflow
11 Desired inflow
12 Hub profile
13 Sense of rotation
20 Hub cone
21 Tip of cone
22 r-axis
23 Machine/cone axis
24 Outer contour of hub cone
25 Max. extension in x-direction
26 Max. extension in r-direction
30 Optimized hub cone
32 Propeller
33 Hub body
34 Machine/cone axis
40 Optimized hub cone
42 Propeller
43 Hub body
44 Machine/cone axis

What is claimed is:

1. A hub cone for an aircraft engine having at least one of a propeller and a blower enveloped by a casing, wherein a contour of the hub cone is described by the following equation:

$$S(x) = R_{max} * \{1-[(x-L_{max})/L_{max}]^2\}^{1/M}$$

where:

$S(x)$: is a shape of the cone, defined along the machine axis x;

$R_{max}$: is a maximum extension of the cone in a radial direction r;

$L_{max}$: is a maximum extension of the cone in the direction of the machine axis x;

M: is a quantity describing the shape $S(x)$.

2. The hub cone of claim 1, wherein M is a positive real number.

3. The hub cone of claim 2, wherein a set of cone shapes is defined by suitable selection of the value of M.

4. The hub cone of claim 3, wherein the set of cone shapes so defined includes all values of M between 1.50 and 1.98.

5. The hub cone of claim 4, wherein the values of M are between 1.89 and 1.945.

6. The hub cone of claim 1, wherein a set of cone shapes is defined by suitable selection of the value of M.

7. The hub cone of claim 6, wherein the set of cone shapes so defined includes all values of M between 1.50 and 1.98.

8. The hub cone of claim 7, wherein the values of M are between 1.89 and 1.945.

* * * * *